Patented June 15, 1948

2,443,385

UNITED STATES PATENT OFFICE 2,443,385

METHOD OF PREPARING CHLOROALKYLAMINE HYDROCHLORIDES

Albert F. Hardman, Akron, Ohio, assignor to Wingfoot Corporation, Akron, Ohio, a corporation of Delaware No Drawing. Application September 30, 1944, Serial No. 556,667

11 Claims. (Cl. 260—583)

This invention relates to the preparation of chloro-substituted alkylamine hydrochlorides from hydroxyalkylamine hydrochlorides. More particularly, it relates to the preparation of chloroethylamine hydrochloride by the direct chlorination of ethanolamine hydrochloride.

It is known that ethanolamine hydrochloride will react with thionyl chloride to form chloroethylamine hydrochloride, but such a process is objectionable, since it necessitates the separate and expensive preparation of the thionyl chloride reagent. Attempts to conduct the reaction by using elemental chlorine have been unsuccessful. Accordingly, one purpose of this invention is to provide a means of reacting hydroxyalkylamine hydrochlorides with elemental chlorine.

It has now been discovered that a direct chlorination of the hydroxyalkylamine hydrochloride can be achieved in the presence of sulphur or a compound which readily yields sulphur, such as sulphur monochloride or sulphur dichloride, all of which are cheap and readily available. The reaction may be conducted at elevated temperatures, preferably between 35° C. and 100° C. by suspending or dissolving the reagents in a suitable liquid, such as chloroform or carbon tetrachloride and passing the chlorine gas into the liquid reactants. Under such conditions the reaction is conducted at or near the reflux temperature. Alternatively, the hydroxyalkylamine hydrochloride may be melted with the elemental sulphur and the chlorine bubbled through the liquid mixture.

The following equations demonstrate the chemical reactions involved in the described treatment of ethanolamine hydrochloride with elemental chlorine, using sulphur, sulphur monochloride and sulphur dichloride, respectively:

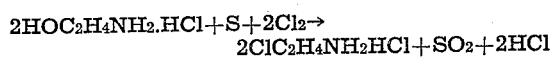

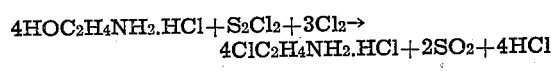

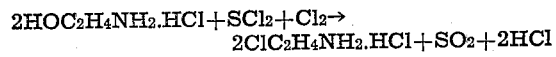

The new process constitutes an economical method for the preparation of chloroethylamine hydrochloride, which can readily be converted to 2-mercaptothiazoline, a rubber vulcanization accelerator, by interaction with carbon bisulfide and subsequently with caustic soda solution.

The invention may be modified by the use of well known economies of by-product utilization. For example, the hydrochloric acid evolved may be recovered and used in preparing the ethanolamine hydrochloride for a subsequent reaction. Further details of the new process are set forth in the following detailed example.

Example

An aqueous solution of 61 grams of ethanolamine was converted to the hydrochloride by the addition of HCl. The solution was then boiled down in an open beaker to drive off the excess HCl and water. The resulting molten ethanolamine hydrochloride was allowed to cool and crystallize. The crystal cake was pulverized and placed in a 1-liter flask with about 250 cc. of chloroform. Sixteen grams of sulphur were added. The mixture was stirred and a rapid stream of chlorine passed through it. The temperature rose from room temperature to 30–35° C. and the suspended crystals slowly became pasty, and in about one hour fused to a viscous liquid which floated on the chloroform. The absorption of chlorine was somewhat slower at this stage due to the decreased surface exposed to its action. After about two hours the suspension became spongy and began to crystallize, the temperature again rising slightly and the rate of chlorine absorption increasing. At the end of four hours the addition of chlorine was stopped, but the stirring was continued for another half hour. The reacted mass was filtered and the product was washed with a little fresh chloroform. The crystals obtained were white and somewhat deliquescent.

Although the invention has been described with respect to the preparation of chloroethylamine hydrochloride, it is also useful for the substitution of chlorine in place of the hydroxyl group of other hydroxyalkylamines and salts thereof. Thus, 3-n-propanolamine hydrochloride, 2-isopropanolamine hydrochloride and 4-n-butanolamine hydrochloride, as well as other hydroxyalkylamine hydrochlorides, may be converted into the corresponding chloroalkylamine salts.

This application is a continuation-in-part of my application Serial No. 432,627, filed February 27, 1942, which has become abandoned.

I claim:

1. The process of preparing a chloroalkylamine hydrochloride which comprises reacting a hydroxyalkylamine hydrochloride with chlorine in the presence of a substance selected from the group consisting of sulphur, sulphur monochloride and sulphur dichloride.

2. The process of preparing chloroethylamine hydrochloride which comprises reacting ethanolamine hydrochloride with chlorine in the presence of a substance selected from the group consisting of sulphur, sulphur monochloride and sulphur dichloride.

3. The process of preparing chloroethylamine hydrochloride which comprises reacting ethanolamine hydrochloride with chlorine in the presence of sulphur.

4. The process of preparing chloroethylamine hydrochloride which comprises reacting ethanolamine hydrochloride with chlorine in the presence of sulphur monochloride.

5. The process of preparing chloroethylamine hydrochloride which comprises reacting ethanolamine hydrochloride with chlorine in the presence of sulphur dichloride.

6. The process of preparing chloroethylamine hydrochloride which comprises reacting a solution of ethanolamine hydrochloride with sulphur and chlorine.

7. The process of preparing a chloroethylamine hydrochloride which comprises reacting a chloroform suspension of ethanolamine hydrochloride with sulphur and chlorine.

8. The process of preparing chloroethylamine hydrochloride which comprises reacting ethanolamine hydrochloride in molten state with sulphur and chlorine.

9. A method of preparing chloroethylamine hydrochloride which comprises heating two mols of ethanolamine hydrochloride with one mol of sulphur and two mols of gaseous chlorine.

10. The process of preparing chloroethylamine hydrochloride which comprises heating ethanolamine hydrochloride with gaseous chlorine in the presence of a substance selected from the group consisting of sulphur, sulphur monochloride and sulphur dichloride.

11. The process of preparing a chloroalkylamine hydrochloride which comprises reacting a hydroxy alkylamine hydrochloride with chlorine in the presence of a sulfur chloride.

ALBERT F. HARDMAN.

REFERENCES CITED

The following references are of record in the file of this patent:

UNITED STATES PATENTS

| Number | Name | Date |
| --- | --- | --- |
| 2,072,348 | Wards | Mar. 2, 1937 |
| 2,163,181 | Ulrich | June 20, 1939 |

FOREIGN PATENTS

| Number | Country | Date |
| --- | --- | --- |
| 341,878 | Great Britain | Jan. 19, 1931 |
| 456,338 | Great Britain | Nov. 3, 1936 |